April 17, 1956
O. H. P. DAWSON
2,742,409
REVIVIFICATION OF SPENT CONTACT CLAY
WITH N-DIALIPHATIC FORMAMIDE
Filed May 31, 1952
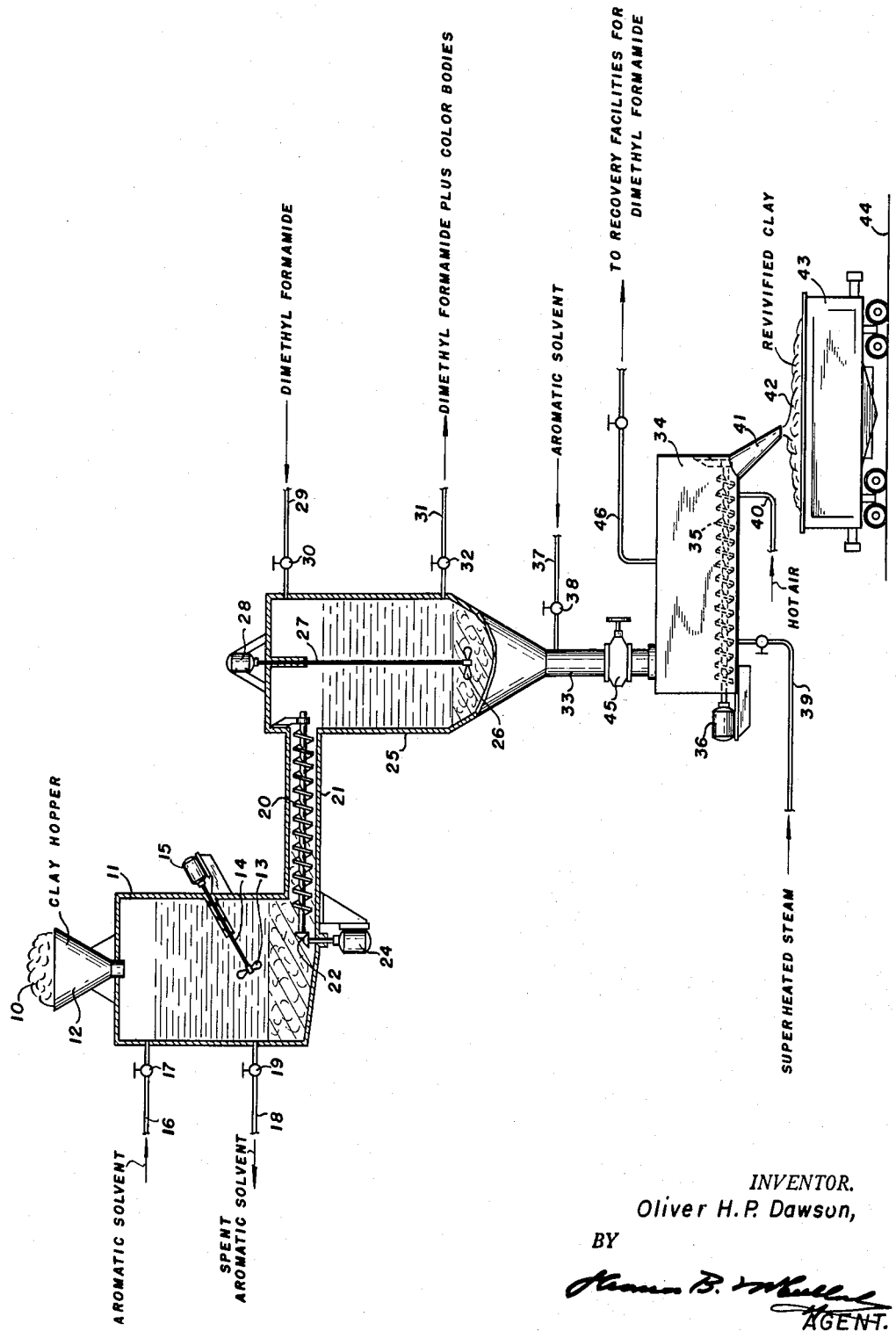
INVENTOR.
Oliver H. P. Dawson,
BY
AGENT.

United States Patent Office 2,742,409
Patented Apr. 17, 1956

2,742,409

REVIVIFICATION OF SPENT CONTACT CLAY WITH N-DIALIPHATIC FORMAMIDE

Oliver H. P. Dawson, Baytown, Tex., assignor, by mesne assignments, to Esso Research and Engineering Company, Elizabeth, N. J., a corporation of Delaware Application May 31, 1952, Serial No. 290,912

9 Claims. (Cl. 196—147)

The present invention is directed to the revivification of spent contact clay. More particularly, the invention is directed to the treatment of spent contact clay to remove color bodies therefrom. In its more specific aspects, the invention is directed to the revivification of spent contact clay and the re-use thereof in treating lubricating oils.

The present invention may be briefly described as involving a method for treating spent contact clays which have become spent in treating lubricating oil fractions and which contain adsorbed color bodies by washing or treating the spent contact clay with N-dialiphatic formamide under conditions to remove the adsorbed color bodies therefrom. The N-dialiphatic formamide containing the color bodies is then separated from the washed or treated clay and the clay then subjected to further treatment, such as by washing with an aromatic hydrocarbon solvent and/or steaming and heating with hot air to recover the clay in substantially revivified condition.

The contact clays used in petroleum refining of lubricating oils and heavy petroleum products are well known to the industry. Reference is made to Kalichevsky and Stagner, "Chemical Refining of Petroleum," Reinhold Publishing Company, New York, 1942, page 284 and following for a description of the contacting operation of lubricating oils and other heavy petroleum products. Contact clays, such as fuller's earth or floridin or others which are known to the art, may suitably be revivified in the practice of my invention.

An aromatic hydrocarbon solvent may suitably be used to wash the spent contact clay prior to the treatment of the spent contact clay with the N-dialiphatic formamide. The aromatic solvent may suitably be an aromatic hydrocarbon, such as benzene, toluene, xylenes, or other higher boiling members of the series of mono-cyclic aromatic hydrocarbons, for example, propyl benzene and the like. The aromatic hydrocarbon may be mixed with the N-dialiphatic formamide and the mixture employed to treat the spent contact clay to remove adsorbed color bodies therefrom. In some instances, it may be desirable to omit the employment of the aromatic hydrocarbon solvent and to treat the spent contact clay only with the N-dialiphatic formamide. This is especially so when a high temperature is employed in the treating operation.

The amounts of aromatic hydrocarbon solvent employed to wash the spent contact clay may range from about 10 volumes to about 300 volumes of aromatic hydrocarbon solvent for every 100 parts of spent contact clay.

The present invention may be employed with the spent contact clay being treated with the dimethyl formamide or with a mixture of dimethyl formamide and aromatic hydrocarbon solvent at a temperature in the range between 100° and 500° F. Good results may be obtained at temperatures ranging from 150° to 250° F.

The N-dialiphatic formamide employed in the practice of my invention is preferably dimethyl formamide but other compounds which suitably may be used include diethyl formamide, dipropyl formamide, di-isopropyl formamide, dibutyl formamide, di-isobutyl formamide, methylethyl formamide, methylpropyl formamide, methyl isobutyl formamide, ethyl isopropyl formamide, divinyl formamide, diallyl formamide and mixtures thereof. The dialiphatic formamide employed in the present invention may suitably boil between about 300° and 500° F.

The amount of the N-dialiphatic formamide employed may range from about 10 volumes to about 300 volumes of di-aliphatic formamide for every 100 parts of the spent clay.

The present invention will be further illustrated by reference to the drawing in which the single figure illustrates one mode of practicing the invention.

Referring now to the drawing, numeral 11 designates a mixing vessel provided with a clay hopper 12 through which spent clay is introduced in the mixing vessel 11. Mixing vessel 11 is provided with a stirring device 13 which is rotated by means of a shaft 14 connected to a motivating means 15, such as an electric motor. The vessel 11 has a line 16 controlled by valve 17 through which aromatic hydrocarbon solvent may be introduced thereto and line 18 controlled by valve 19 by way of which the aromatic solvent may be withdrawn. Connected to the bottom of vessel 11 is an extruder device 20 which is arranged in an enlarged conduit 21. Extruder device 20 is motivated through gears 22 which are operated by shaft 23 connected to a motivating means 24 which suitably may be an electric motor. The enlarged conduit 21 discharges into a cone-shaped vessel 25 which is provided with a mixing means or agitator 26 carried by a shaft 27 which is connected, in turn, to a motivating means 28, such as an electric motor, arranged on the top of the vessel 25.

Leading into the top of vessel 25 is line 29 controlled by valve 30 through which dimethyl formamide or other di-aliphatic formamide is introduced. At a lower point of the vessel 25 is a second line 31 controlled by valve 32 by way of which dimethyl formamide containing dissolved color bodies is removed. The cone-shaped vessel 25 connects at the bottom thereof by way of an enlarged conduit 33 with an elongated chamber 34 in which an extruder device 35 is arranged. Extruder device 35 is operated by a motivating means 36, such as an electric motor. Provision is made for introducing an aromatic hydrocarbon solvent, such as one of the type illustrated, into conduit 33 by way of line 37 controlled by valve 38. Further provision is also made to introduce into chamber 34 superheated steam by line 39 and hot air through line 40. A conveyor spout 41 allows the revivified clay 42 to be deposited into a hopper car 43 on track 44.

In practicing the present invention spent contact clay 10 in hopper 12 which had become spent by treatment of lubricating oil and/or heavy petroleum products is introduced into the vessel 11. There is also introduced into the vessel 11, if desired, an aromatic hydrocarbon solvent by way of line 16 by opening valve 17. Motivating means 15 is then started which causes the aromatic hydrocarbon solvent, for example, a xylenes fraction, to be intimately admixed with the spent contact clay. This results in the aromatic hydrocarbon solvent dissolving out any lubricating oil which may be entrained or adsorbed by the spent contact clay. The used aromatic hydrocarbon solvent containing dissolved lubricating oil components may then be withdrawn by line 18 controlled by valve 19 for recovery of the aromatic hydrocarbon solvent and the lubricating oil fraction contained therein.

The aromatic hydrocarbon-washed spent contact clay is then discharged by extruder 20 into the cone-shaped vessel 25 and is admixed with dimethyl formamide introduced by line 29, agitator 26 being operated by energizing motor 28 causing the dimethyl formamide to contact intimately the spent contact clay which has been washed with aromatic hydrocarbon solvent. After the washed solvent has been treated with the dimethyl formamide, the dimethyl formamide containing dissolved color bodies, which have been removed from the spent contact clay, is withdrawn by opening valve 32 in line 31. Optionally the treated contact clay in the lower portion of the vessel 25 may then be washed with further amounts of aromatic hydrocarbon solvent by introducing same to the conduit 33 by line 37 controlled by valve 38, the treated contact clay flowing through conduit 33 to chamber 34 by opening valve 45. In chamber 34 the treated clay is subjected to further treatment with superheated steam to drive off the dimethyl formamide and aromatic solvent introduced by line 37 occluded with the treated clay and then with hot air, if desired, the superheated steam and hot air being introduced to chamber 34 by lines 39 and 40, respectively. The dimethyl formamide and any aromatic solvent occluded with the clay in vessel 34 is withdrawn therefrom by line 46 in admixture with the water vapor and hot air for introduction into suitable recovery facilities, not shown, to recover the dimethyl formamide and the aromatic solvent for re-use as may be described.

The dried clay free of color bodies and the treating reagent is then withdrawn through chute 41 to hopper car 43 for transportation to the lubricating oil treating facilities in the refinery. It is contemplated that the revivified clay may be re-used to treat additional quantities of the same lubricating oil which caused it to become spent or it may be used to treat other lubricating oils.

It is possible to incorporate the washing and treating operations as described in the single figure into a single step by forming a mixture of the aromatic hydrocarbon solvent and the dimethyl formamide. Thus one of the vessels 11 or 25 might be dispensed with and a mixture of aromatic hydrocarbon solvent and dimethyl formamide formed and used to treat the spent clay introduced by hopper 12.

If a high temperature is employed within the range given, it is possible to omit entirely the washing operation in which an aromatic hydrocarbon solvent is used and to treat the spent contact clay only with the dimethyl formamide. In any of the described operations, the treated clay would be subjected to treatment with an aromatic hydrocarbon solvent or to steaming and/or blowing with hot air to remove the dimethyl formamide.

The invention will be further illustrated by the following runs in which a spent contact clay which had been used in the contacting of light motor oil was washed at 150° F. with two successive 200 volume per cent batches of xylene. The washed clay substantially free of lubricating oil and xylene was then washed at 150° F. with two successive 200 volume per cent batches of dimethyl formamide. The washed clay was freed of dimethyl formamide by steaming at about 300° F. The data shown below in Table I shows that the color of the clay was changed from black to a straw color.

*Table I*

Clay washing:
Spent clay charge, parts_____ 100.
Xylene wash, volumes_____ 2 x 200.
Oil removed, parts_____ 13.3.
Color of clay_____ Black.
Dimethylformamide wash, volumes_____ 2 x 200.
Color material removed, parts [1]_____ 3.2.
Color of clay_____ Straw.

[1] Material was hard, sticky and highly colored.

The clay which was washed with xylene and dimethyl formamide, as illustrated above, was then employed to contact a motor oil stock, one pound of clay being used for each gallon of the motor oil stock. Comparisons were made on the oil, without contacting, with contacting using the clay which had been washed only with xylene, and with the clay which had been washed with xylene and dimethyl formamide. A further comparison was made using a fresh Millwhite No. 2 clay in the contacting operation. The Robinson color of the oil without contacting with any clay was 2. Contacting of the oil with the xylene-washed clay resulted in an oil having a Robinson color of 2 also. On the other hand, the clay which has been treated in accordance with the present invention with xylenes and dimethyl formamide when employed to contact the same oil gave a color for the contacted oil of 5. This compares favorably with a color of 6¾ for the oil which had been contacted with the fresh Millwhite No. 2 clay.

In order to illustrate the invention further, 100 parts of spent clay which had become spent in treating lubricating oil and which contained color bodies was washed at 150° F. with two successive 200 volume per cent batches of a 50–50 blend of xylene and dimethyl formamide. The first washing operation resulted in the recovery of about 15 parts of a dark colored liquid composed mainly of lubricating oil and color bodies while the second washing operation resulted in about three parts of a dark colored liquid composed of lube oil and color bodies. The clay after this treatment was then employed to contact the light motor oil mentioned above and after the contacting operation the oil had a 5½ Robinson color.

It will be seen from the foregoing specific runs that the clay on treatment in accordance with the present invention is revivified and can be used to contact lubricating oil to improve its color.

The nature and objects of the present invention having been completely described and illustrated, what I wish to claim as new and useful and to secure by Letters Patent is:

1. A method for treating contact clay which has become spent in treating a lubricating oil fraction and which contains color bodies adsorbed from the lubricating oil which comprises treating said spent clay with a sufficient amount of a N-dialiphatic formamide boiling below about 500° F. to remove color bodies from said spent clay and then recovering said treated clay substantially free of color bodies.

2. A method for treating contact clay which has become spent in treating a lubricating oil fraction and which contains color bodies adsorbed from the lubricating oil which comprises washing said spent clay with an aromatic hydrocarbon solvent to remove lubricating oil adsorbed by said spent clay, treating said washed clay with a sufficient amount of a N-dialiphatic formamide boiling below about 500° F. to remove color bodies from said washed clay, and then recovering said treated clay substantially free of color bodies.

3. A method in accordance with claim 2 in which the N-dialiphatic formamide is N-dimethyl formamide and the aromatic solvent is a xylene.

4. A method for treating contact clay which has become spent in treating lubricating oils and which contains color bodies adsorbed from the lubricating oil which comprises treating said spent clay with a mixture of a N-dialiphatic formamide boiling below about 500° F. and an aromatic hydrocarbon solvent and recovering said treated clay substantially free of color bodies.

5. A method in accordance with claim 4 in which the N-dialiphatic formamide is N-dimethyl formamide and the aromatic solvent is a xylene.

6. A method for treating contact clay which has become spent in treating a lubricating oil fraction and which contains color bodies adsorbed from the lubricating oil which comprises treating said spent clay with a sufficient amount of dimethyl formamide at a temperature in the range between 100° and 500° F. to remove color bodies from said spent clay and recovering said treated clay substantially free of color bodies.

7. A method for treating contact clay which has become spent in treating a lubricating oil fraction and which contains color bodies adsorbed from the lubricating oil which comprises washing said spent clay with an aromatic hydrocarbon solvent to remove lubricating oil adsorbed by said spent clay, treating said washed clay at a temperature in the range from 100° to 500° F. with a sufficient amount of dimethyl formamide to remove color bodies from said washed clay, and then recovering said treated clay substantially free of color bodies.

8. A method for treating contact clay which has become spent in treating lubricating oil and which contains color bodies adsorbed from the lubricating oil which comprises treating said spent clay at a temperature in the range from 100° to 500° F. with a mixture of a dimethyl formamide and an aromatic hydrocarbon solvent and recovering said treated clay substantially free of color bodies.

9. A method for treating lubricating oil containing color bodies which comprises contacting said lubricating oil with a contact clay under conditions to adsorb color bodies therefrom, treating said clay containing adsorbed color bodies with a sufficient amount of a N-dialiphatic formamide boiling below about 500° F. to remove color bodies from said clay, recovering said clay substantially free of color bodies and contacting additional quantities of said lubricating oil with said clay, from which color bodies have been removed.

References Cited in the file of this patent

UNITED STATES PATENTS

| | | |
|---|---|---|
| 1,558,163 | Hall | Oct. 20, 1925 |
| 2,102,341 | Von Fuchs | Dec. 14, 1937 |
| 2,166,140 | Hansley | July 18, 1939 |
| 2,168,327 | Cowles et al. | Aug. 8, 1939 |
| 2,352,064 | Zerbe | June 20, 1944 |
| 2,608,519 | Deters et al. | Aug. 26, 1952 |

OTHER REFERENCES

Kalichevsky: Modern Methods of Refining Lubricating Oils (1938), Reinhold Publishing Corp., 330 W. 42d Street, New York, N. Y., pages 22 and 111.